Sept. 4, 1923.
R. B. DISBROW
PNEUMATIC TIRE
Filed Sept. 30, 1922
1,466,891
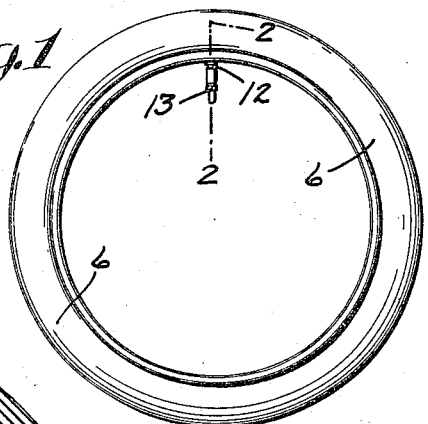
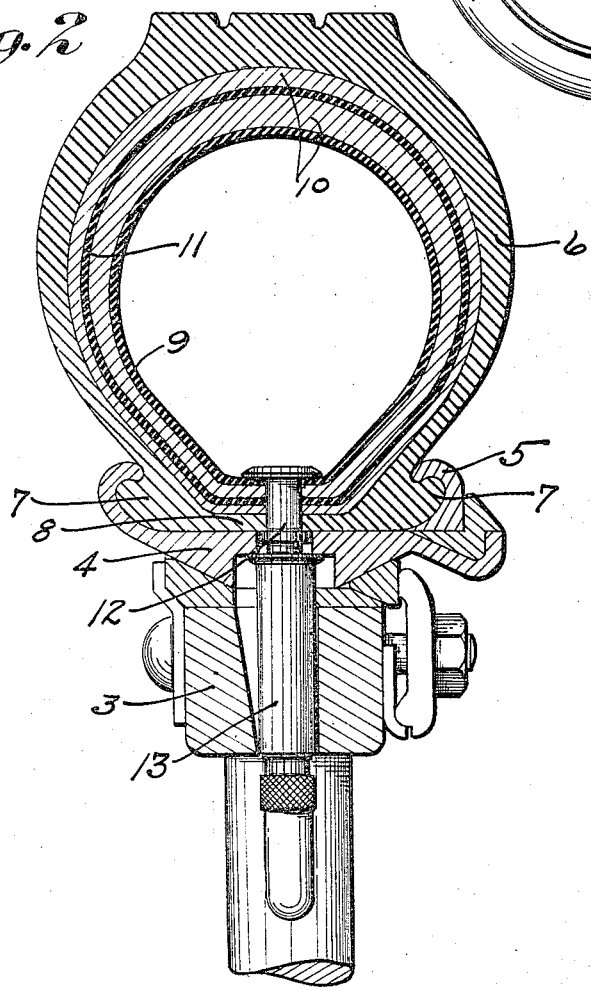
Inventor
Reuben B. Disbrow
By his Attorneys
Michael & Kilgore Patented Sept. 4, 1923.

1,466,891

UNITED STATES PATENT OFFICE.

REUBEN B. DISBROW, OF OWATONNA, MINNESOTA, ASSIGNOR OF ONE-HALF TO L. P. ORDWAY, OF ST. PAUL, MINNESOTA.

PNEUMATIC TIRE.

Application filed September 30, 1922. Serial No. 591,651.

*To all whom it may concern:*

Be it known that I, REUBEN B. DISBROW, a citizen of the United States, residing at Owatonna, in the county of Steele and State of Minnesota, have invented certain new and useful Improvements in Pneumatic Tires; and I do hereby declare the following to be a full, clear, and exact description of the invention, such as will enable others skilled in the art to which it appertains to make and use the same.

My invention provides a highly important improvement in pneumatic tires and is in the nature of a combined non-leak casing and air tube incorporated as a single tube structure. Between the outer or tread layer and the lining or inner layer is a puncture-sealing substance composed in whole or in part of raw or uncured rubber. The lining or inner layer is of tough flexible rubber, such as used in making inner tubes, and, in fact, takes the place of the inner tube and forms the lining or inner surface of the single tube structure. To increase the puncture-sealing feature of the tire, an intermediate layer of tough rubber, much like the lining but of greater cross-section, is extended through the raw or uncured rubber layer so that the latter will be both on the inner and outer surfaces thereof. The outer or tread layer will preferably be built up of rubber and canvas or cords, much like an outer casing.

A preferred form of the improved tire is illustrated in the accompanying drawings, wherein like characters indicate like parts throughout the several views.

Referring to the drawings:

Fig. 1 is a side elevation of the improved tire; and

Fig. 2 is an enlarged transverse section taken on the line 2—2 of Fig. 1 and showing the tire applied in working position to an ordinary demountable rim.

In Fig. 2, the numeral 3 indicates an automobile rim and the numerals 4 and 5 indicate, respectively, the demountable body and the detachable flange of said rim.

In side and top or edge elevations, the improved tire has the appearance of an ordinary pneumatic tire and it may, of course, be made of any suitable design. Its outer or tread layer is indicated by the numeral 6. This tread layer, at the rim-engaging portion, has the usual flange-engaging beads 7, but these beads are not separated, as in the customary tire casing, but are connected by a cylindrical web 8 that rests directly against the body 4 of the wheel rim.

The tough rubber inner layer 9 of the tire forms a complete endless tube or lining to the complete tire and is spaced from the interior of the outer layer 6. The space between the exterior of the lining 9 and the interior of the outer layer 6 is, as already indicated, filled in with raw or uncured rubber 10. The soft uncured rubber layer 10 has an eccentric cross-section and is thickest at its outer portion, and the same is true of the outer layer 6. The soft rubber layer 10 is divided into inner and outer portions by an interposed tough rubber tube 11 that performs an important function, partly already noted but to be hereinafter more fully set forth. This intermediate tough rubber layer 11, as shown, is a complete tube but, in some instances, would not be extended completely around the inner portion of the tire.

With the tire structure described, if a nail or the like should be forced completely through the tire, it would have to pass through both layers of uncured rubber and through both of the tough rubber tubes 9 and 11. While such nail remains in the tire, there could be no leakage of air because the soft uncured rubber would tightly close the joint between the nail and the puncture. When the nail is removed, the soft uncured rubber, partly by adhesion to the nail and partly because of internal pressure, will follow the nail into the puncture, completely filling the same and sealing the puncture. The sealing of the puncture is produced by internal pressure and an outward flow of uncured rubber radially outward or away from the lining tube 9, so that it does not do to rely much on closing of punctures in said tube 9. However, the puncture will be sealed first by a flow of the uncured rubber into the puncture of the intermediate tube 11 and, second, by a flow of the uncured rubber into the outer tread layer 6, and thus, a double seal of the puncture is produced entirely by automatic action. Of course, the larger the number of layers of uncured rubber and tough rubber layers, or the like, the more securely will the puncture be sealed. In actual practice, I have found that with a single intermediate tough rubber layer interposed in the raw or uncured rubber, there will not, under any extreme conditions that have been produced by various large nail punctures and the like, be any leakage of air from the tire because of the punctures.

The tire shown is provided with the customary air-charging valve stem 12 equipped with a dust cap 13. The soft or uncured rubber layers act as a cement or binder to hold together but to space apart the tubular elements 6, 9 and 11 of the complete single tube tire structure.

Not only is the tire made a non-leak tire, but its mileage is greatly increased and the liability of blow-outs, during any reasonably long usage, is practically eliminated. The soft rubber layers prevent pinching and cranking of the sides of the outer or tread section or layer and, moreover, the complete tire is made very flexible, which is a good security against damage to the fabric or cords incorporated in the outer tread section.

The very great inconvenience and resulting loss in time and money due to delays incurred from tire punctures is too well understood to require any extended comment. My invention practically eliminates all such annoyances and losses.

What I claim is:

A single tube pneumatic tire comprising a casing having circumferential beads, a tough flexible lining and an interposed layer of soft elastic substance, the latter binding the inner and outer layers permanently together, giving increased resistance to the tire and operating to seal punctures, the circumferential air passage in said lining being continuous and said casing completely surrounding and enclosing said lining and interposed layer.

In testimony whereof I affix my signature.

REUBEN B. DISBROW